United States Patent [19]

Saito

[11] 4,255,619
[45] Mar. 10, 1981

[54] TELEPHONE RESERVATION-PROCESSING SYSTEM

[75] Inventor: Hideo Saito, Koganei, Japan

[73] Assignees: Keihin Electric Express Railway Co., Ltd.; Tokyo Shibaura Denki Kabushiki Kaisha, both of Japan

[21] Appl. No.: 72,684

[22] Filed: Sep. 5, 1979

[30] Foreign Application Priority Data

Oct. 14, 1978 [JP] Japan .................. 53-125708

[51] Int. Cl.³ .......................................... H04M 11/00
[52] U.S. Cl. .................................................. 179/2 A
[58] Field of Search .................... 179/2 A, 84 R, 2 R, 179/2 DP

[56] References Cited

U.S. PATENT DOCUMENTS

| | | | |
|---|---|---|---|
| 4,013,838 | 3/1977 | Tsai | 179/2 A |
| 4,124,773 | 11/1978 | Elkins | 179/2 A |

OTHER PUBLICATIONS

Horikawa et al., "Audio Response System Using Optical Film Drum," Fujitsu Sci. & Tech. J., (Japan), vol. 11, No. 1, 3/75, pp. 49-64.

Primary Examiner—Stuart N. Hecker
Attorney, Agent, or Firm—Finnegan, Henderson, Farabow, Garrett & Dunner

[57] ABSTRACT

A telephone reservation-processing system, which comprises:
a host computer;
a plurality of audio response type computers connected to the host computer through telephone lines and installed in various districts; and at least one terminal unit-controlling computer connected to the host computer through a telephone line, and wherein the host computer includes means for processing data relative to inquiries, reservations and cancellations delivered from the plural audio response type computer, and means for processing data relative to requests for transmission of data supplied from the plural audio response type computer; the plural audio response type computers respectively include means for converting an output signal from the host computer into an audio signal; and the terminal unit-controlling computer includes means for transmitting data delivered from the host computer to the telephone transmission terminal unit.

6 Claims, 13 Drawing Figures

TELEPHONE RESERVATION-PROCESSING SYSTEM

This invention relates to a telephone reservation-processing system which is organized by installing a plurality of audio response type computers in various districts and connecting said local computers to a central host computer through a telephone line.

In various fields of business including special training schools, hotels, electric trains, airways, etc., an electronic computing system is applied to process reservation requests. A concrete example of equipment used to process, for example, airway reservations is set forth in the U.S. Pat. No. 3,484,748.

On the other hand, a telephone reservation-processing system having an audio response function has been proposed due to the development of an automatic audio response device. A telephone reservation-processing system having an audio response function which is practically applied in Japan is represented by the telephone seat reservation-processing system adopted by the Japanese national railways. This telephone seat reservation-processing system is disclosed in the laid-open patent application Ser. No. 86,733, 1977. However, this disclosed telephone seat reservation-processing system is only provided with a single audio response type computer system. Moreover, only those telephone subscribers living in the 23 wards of Tokyo who have a push button type telephone can be serviced by said audio response type computer system.

An audio response device used with the telephone seat reservation-processing system comprises a magnetic drum type memory to store digitized audio data (audio pattern). However, the magnetic drum type memory equipped with a mechanical control device unavoidably has a low reliability, and involves a complicated maintenance work. Further, particular precaution should be taken in recording voice patterns in the tracks of the magnetic drum type memory. Audio patterns are recorded in the drum memory tracks either by the speed buffer system or time division multiple recording system. The speed buffer system is the type which records an audio pattern in the drum type memory tracks as in the ordinary data-recording process. Where, however, many telephone lines have to be handled, the speed buffer system has the drawbacks of consuming much time in reading an audio pattern and requiring a large capacity buffer memory for each telephone line. The time division multiple recording system is the type which records all audio patterns in the drum type memory tracks in the form divided in the prescribed length. However, this time division multiple recording system rearranges divided audio patterns into a required message and unavoidably consumes long time in the compilation of data.

It is accordingly an object of this invention to provide a telephone reservation-processing system which is organized by installing a plurality of audio response type computer systems in various districts and connecting these audio response type computer systems to a central host computer having a reservation file by means of a telephone line.

Another object of the invention is to provide a telephone reservation-processing system in which a plurality of audio response type computer systems are connected through a telephone line to a household or public telephone; the household or public telephone is fitted with a portable data transmitter; and reservations, inquiries or cancellations can be carried out through said portable data transmitter.

Still another object of the invention is to provide an audio response type computer system, in which audio patterns are stored in an audio memory formed of a high speed random access memory, and this audio memory is accessed by address-word length information delivered from a plurality of audio channels.

A further object of the invention is to provide a terminal unit-controlling computer system provided with, for example, a display terminal unit for indicating reservation data transmitted from a host computer.

This invention can be more fully understood from the following detailed description when taken in conjunction with the accompanying drawings, in which.

Figure 3:
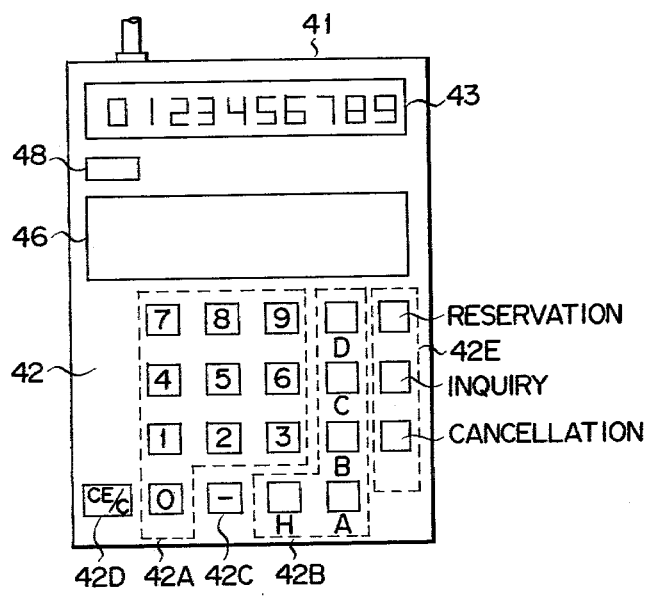
Figure 4:
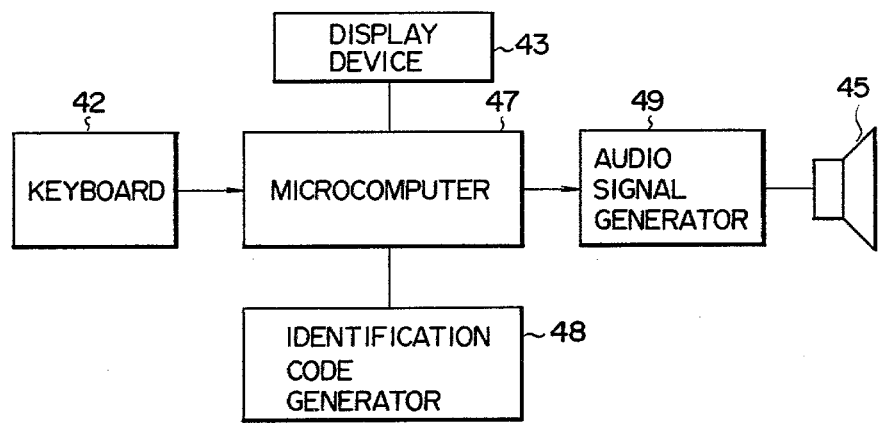
Figure 6:
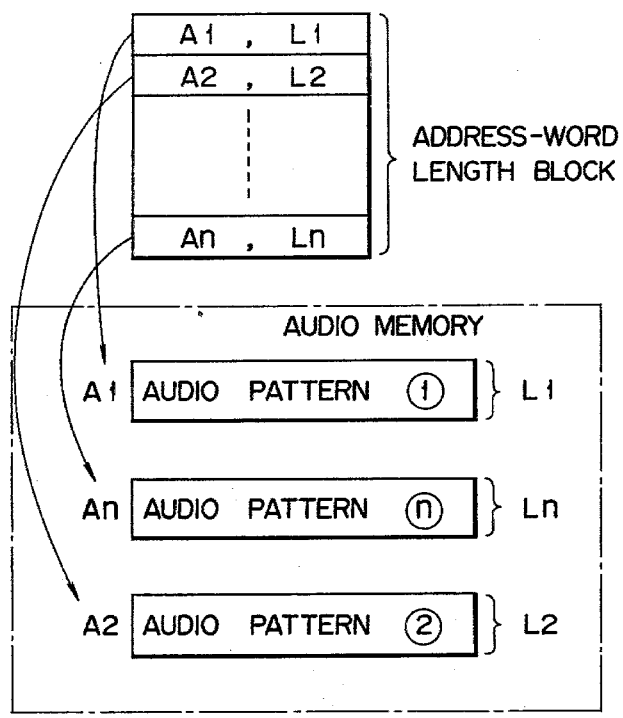
Figure 5:
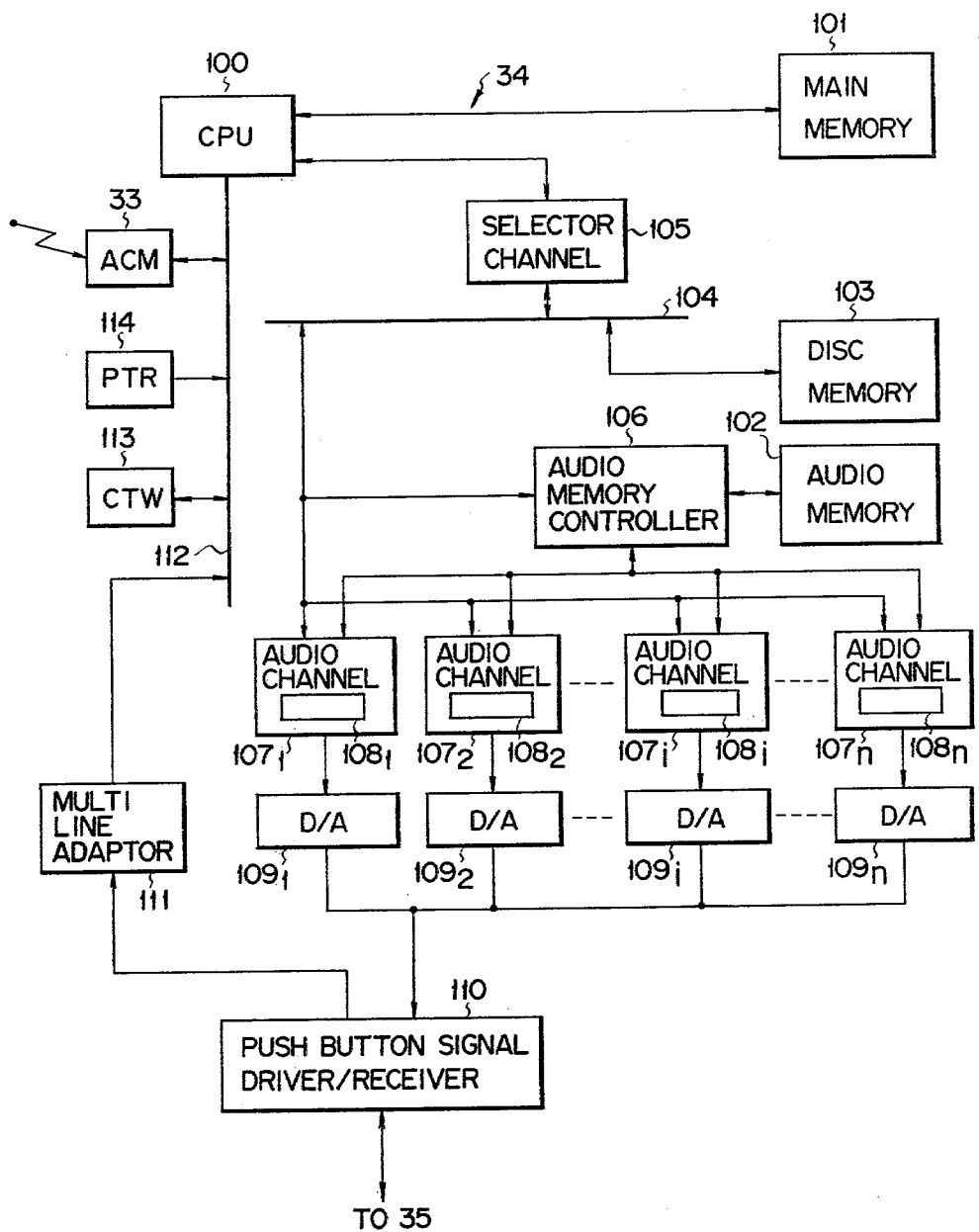
Figure 7:
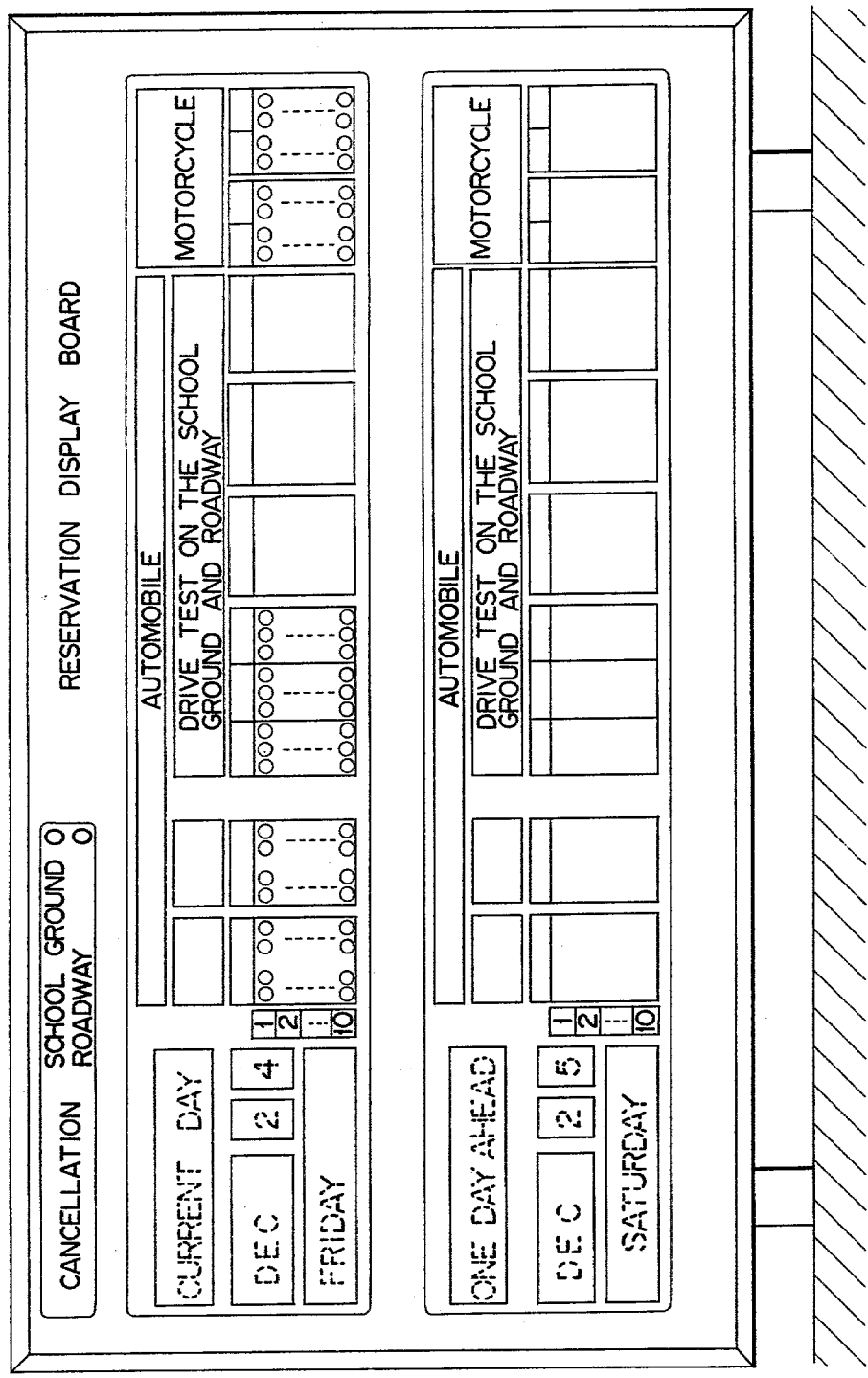
Figure 8A:
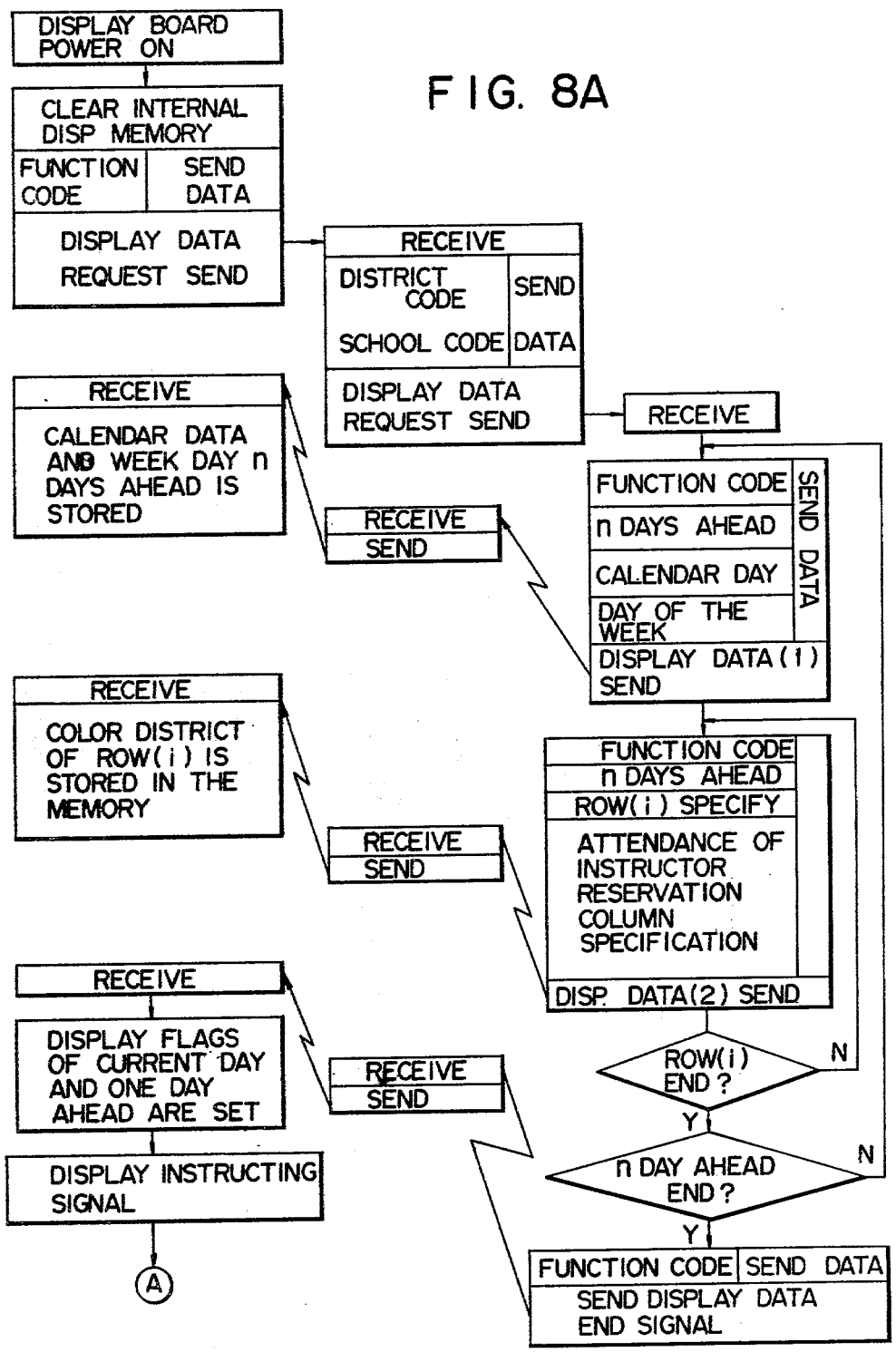
Figure 8B:
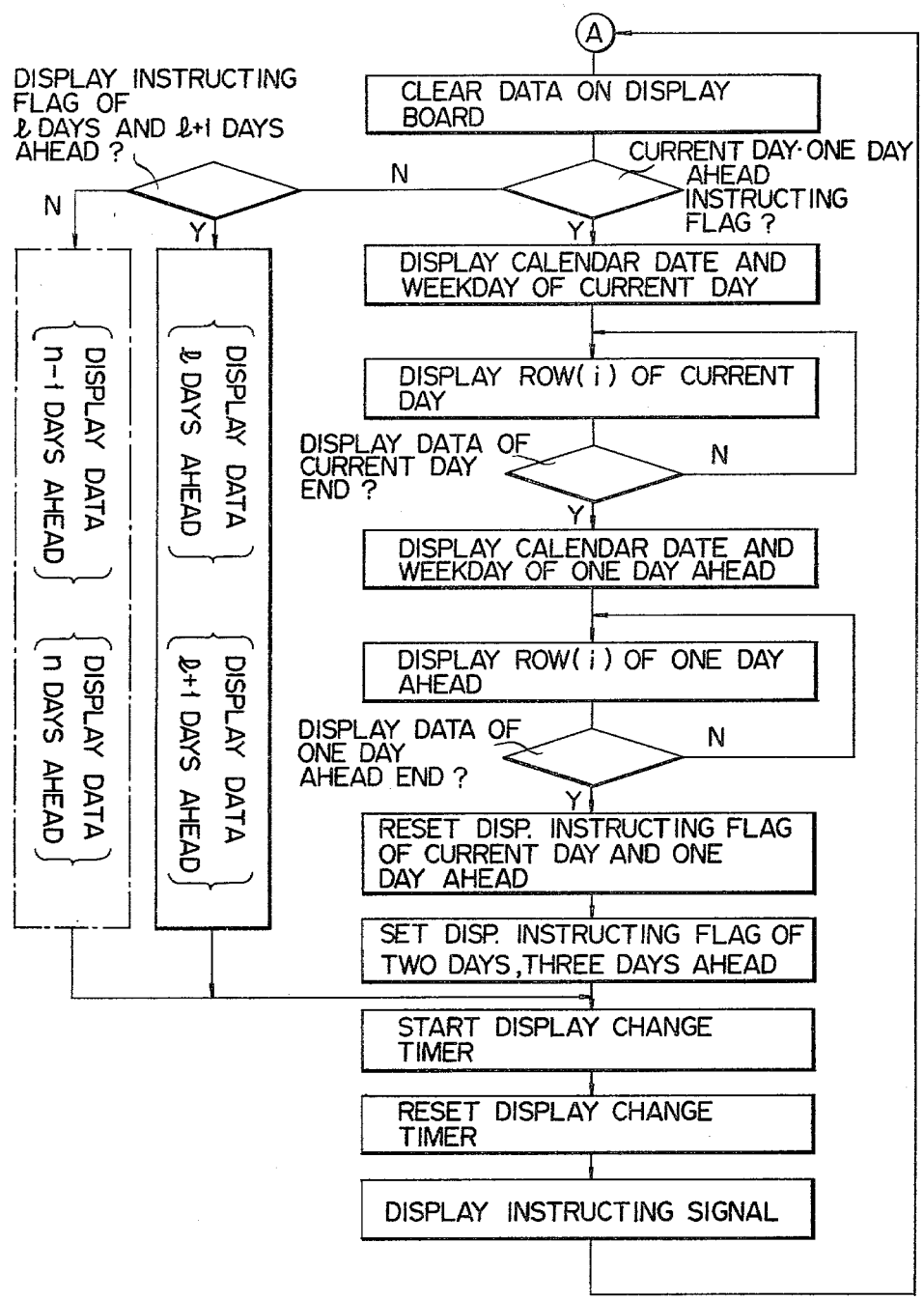
Figure 9A:
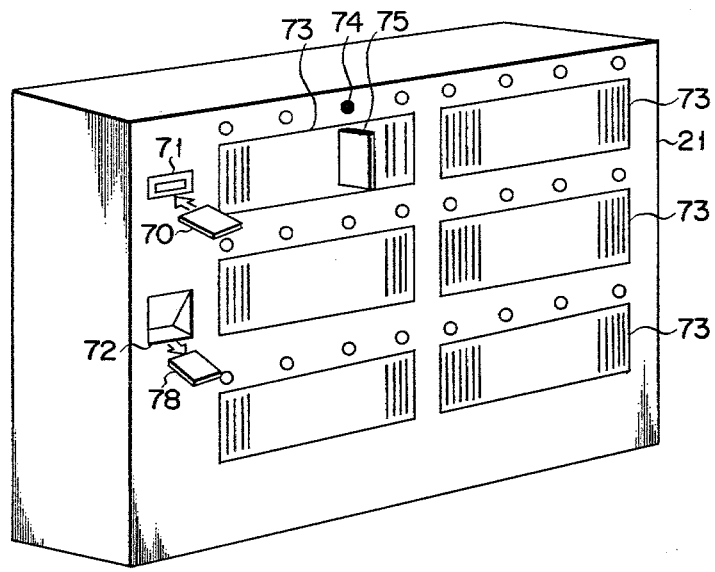
Figure 9B:
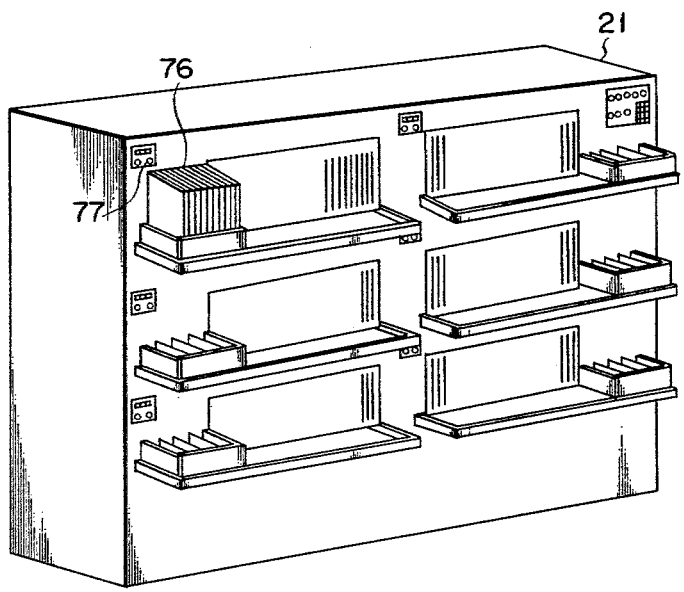
Figure 10A:
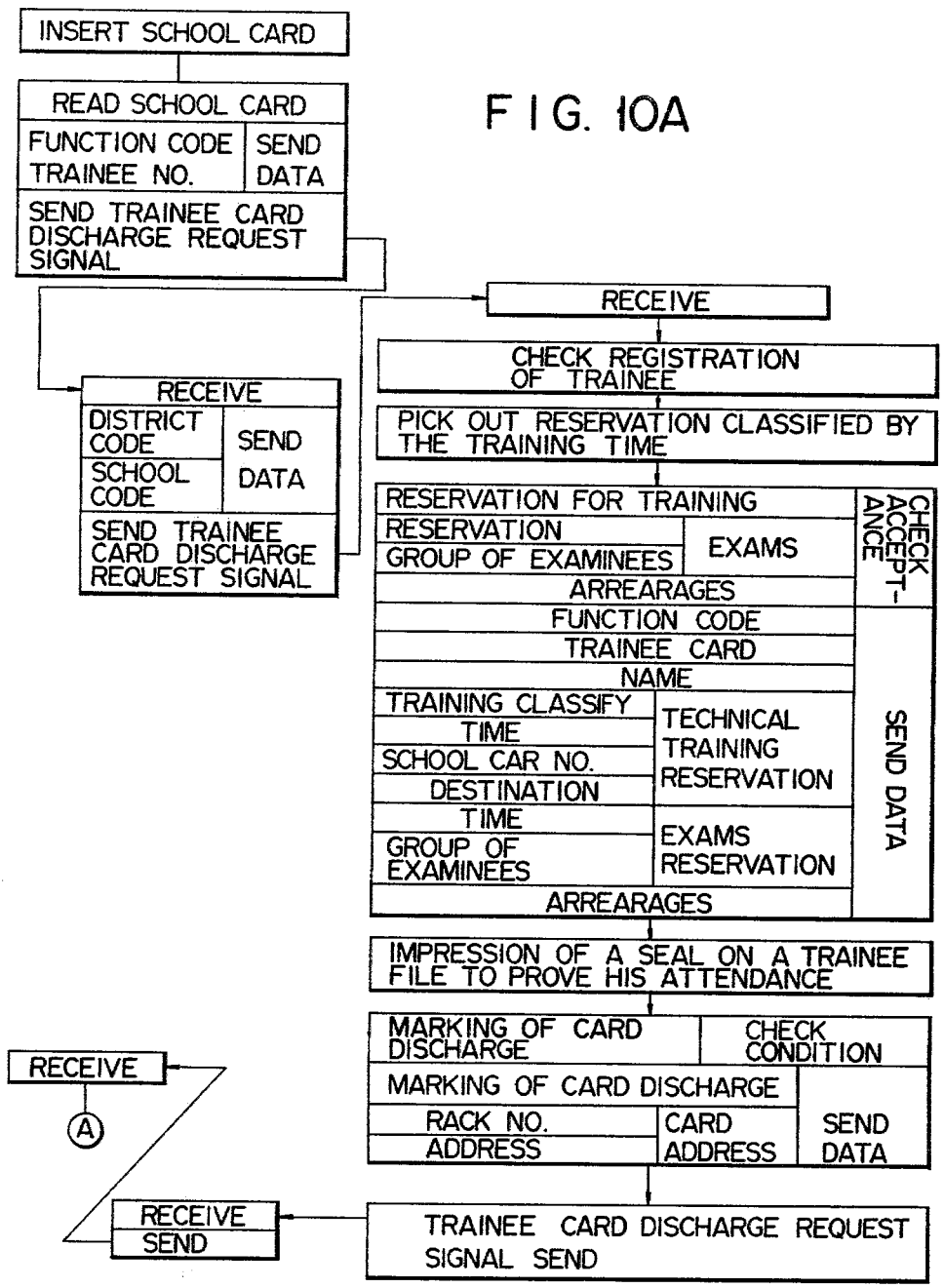
Figure 10B:
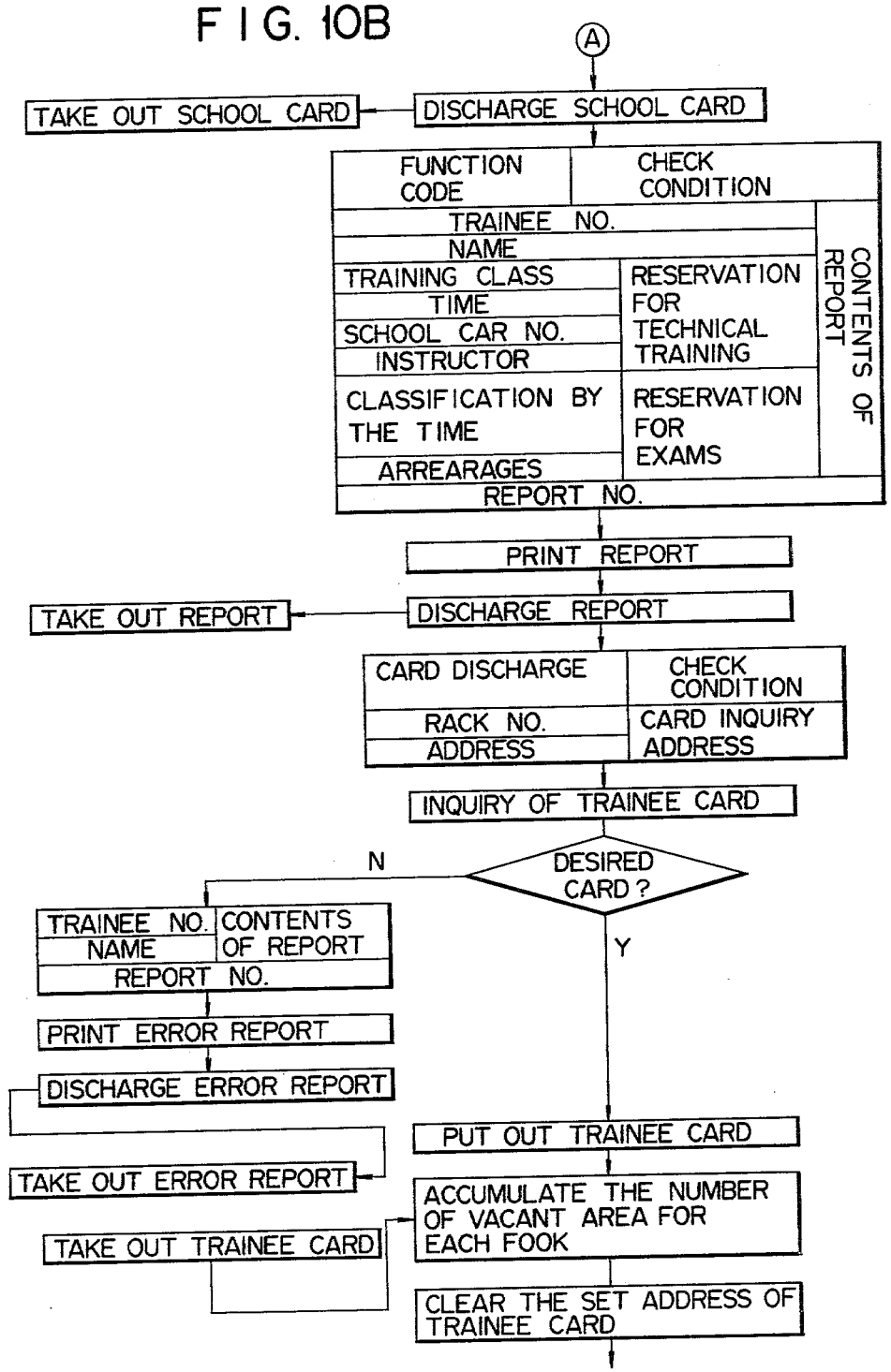

FIG. 3 indicates the external appearance of the portable data transmitter;

FIG. 4 is a block circuit diagram of hardwave included in the portable data transmitter used with the telephone reservation-processing system of a invention;

FIG. 5 is a block circuit diagram of hardware included in an audio response type computer system used with the telephone reservation-processing system of the invention;

FIG. 6 shows relationships between the address-word length blocks for accessing the audio memory of FIG. 5 and audio patterns;

FIG. 7 illustrates the external appearance of a reservation display board connected to a terminal unit-controlling computer included in the telephone reservation-processing system of the invention applied to an automobile drive training institution;

FIGS. 8A and 8B show a route through which data is transmitted between the reservation display board, terminal unit-controlling computer and host computer;

FIGS. 9A and 9B jointly illustrate an automatic card discharge machine connected to the terminal unit-controlling computer included in the telephone reservation-processing system of this invention applied to an automobile drive training school; and FIGS. 10A and 10B indicate the data transfer route through which data is transmitted between the host computer, automatic and discharge machine, and terminal unit-controlling computer.

Figure 1:
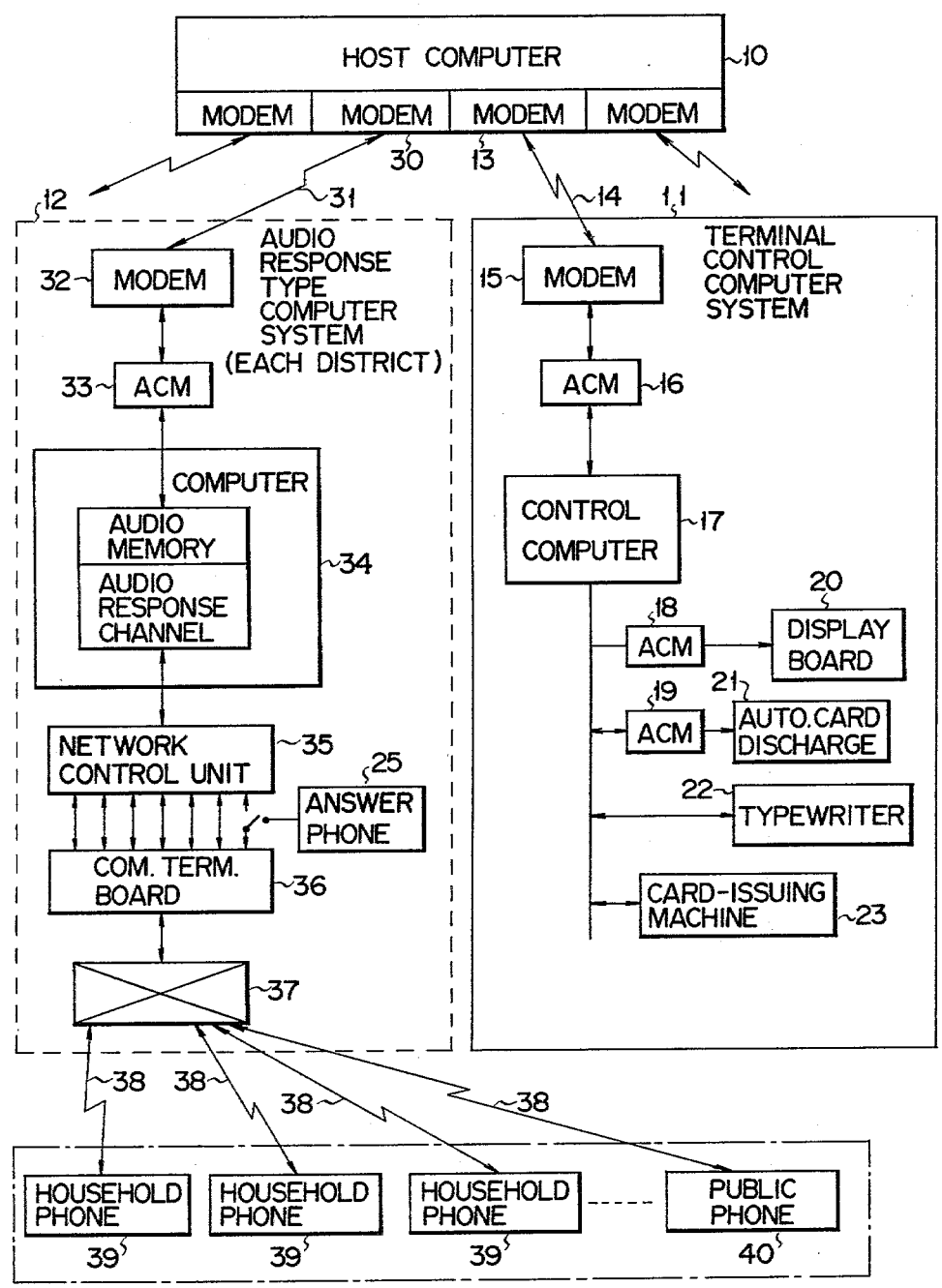
FIG. 1 is a block circuit diagram of the whole telephone reservation-processing system embodying this invention.

FIG. 1 is a block circuit diagram of the whole telephone reservation-processing system embodying this invention. A host computer 10 is installed in, for example, a computer center. This host computer comprises a data base which is supplied with reservation data, a program for processing responses to various requests such as reservations, inquiries and cancellation and a program for processing demands for data transmission.

An audio response type computer sytem 12 is set in the computer rooms of various districts. For briefness of illustration, FIG. 1 indicates only one audio response type computer system 12. This computer system 12 is connected to the host computer 10 through a modem 32, telephone line 31 and modem 30. An audio response type computer 34 is provided in the audio response type computing system 12. The audio response type computer 34 is connected to the modem 32 through an adapter 33. The audio response type computer 34 comprises, for example, an audio memory and audio channel. The audio response type computer 34 is connected to a household telephone 39 or public telephone 40 through a network control unit 35, communication terminal board 36, subscriber telephone network 37 and telephone line 38. The communication terminal board 36 is connected to an answer phone 25.

Figure 2:
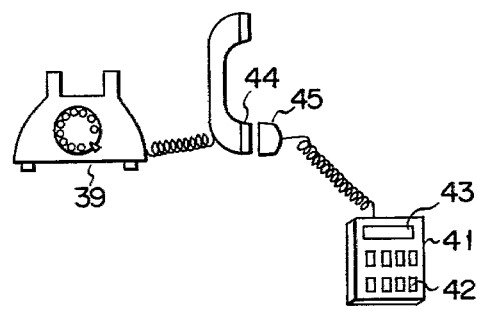
FIG. 2 illustrates a telephone fitted with a portable data transmitter.

A terminal unit-controlling computer 11 is installed in at least one general or business office. This terminal unit-controlling computer 11 is connected to the host computer 10 through a modem 15, telephone line 14 and modem 13. Provided in the terminal uni-controlling computer 11 is a control computer 17, which is connected to the modem 15 through an adapter. The terminal unit-controlling computer 11 is provided with terminal units adapted for various fields of business. FIG. 1 shows a display board 20 and automatic card discharge machine 21 as examples of the terminal unit. The display board 20 and automatic card discharge machine are connected to the control computer 17 through adapters 18, 19. The control computer 17 controls transmission of data between the host computer 10, the display board 20 and automatic card discharge machine 21. Further, a typewriter 22 is provided as means for transmitting data between the terminal unit-controlling computer 11 and host computer 10. The typewriter 22 is also connected to the control computer 17. The terminal unit-controlling computer 11 comprises an OFF-Line card-issuing machine 23, which produces a magnetic card to be supplied to the automatic card discharge machine 21. The user of the telephone reservation-processing system of this invention carries out operations such as reservations, inquiries or cancellations by means of a portable data transmitter 41. FIG. 2 illustrates the manner in which the portable data transmitter 41 is connected to a telephone. The portable data transmitter 41 comprises an operation keyboard 42, display device 43 and acoustic coupler 45 fitted to the transmitter 44 of a telephone 39.

FIG. 3 is an enlarged view of the portable data transmitter 41, though the acoustic coupler 45 of FIG. 2 is not shown. The operation keyboard 42 has numeral keys 42A, notation keys 42B, minus key 42C, clear end/all clear key 42D, and instruction keys 42E (for example, keys for reservation, inquiry and cancellation). The numeral keys 42A and notation keys 42B are used to preset data being transmitted. The minus key 42C is used to indicate that part of the transmitted data which is unnecessary. The clear end/all clear key 42D clears the last digit of a preset data when pushed once, and clears all preset data when pushed twice in succession. The instruction keys 42E are used to transmit preset data. Data of transmission processed by the keys 42A, 42B, 42C is indicated on the display device 43. The portable data transmitter 41 is provided with a power supply switch 48 and a label 46 indicating the operation procedure and the display sections to be shown on the display device 43.

FIG. 4 shows the arrangement of the portable data transmitter 41. As described above, the portable data transmitter 41 is a telephone network entry terminal unit for transmitting data to a public telephone network through the acoustic coupler 45 attached to the transmitter 44 of the telephone 39. In view of the function acting as a terminal unit, the portable data transmitter 41 should be so shaped as to be easily carried to any location where a telephone is installed. The host computer supplied with data from many users through the portable data transmitters 41 should be so designed as to distinguish between the telephone users who have supplied data. In other words, it is necessary to attach an individual identification code to the portable data transmitters 41 owned by telephone users.

Therefore, the portable data transmitter 41 used with the telephone reservation-processing system of this invention contains a circuit for producing an identification code specified for said portable data transmitter 41. As shown in FIG. 4, the portable data transmitter 41 used in this invention comprises a keyboard 42, microcomputer 47, display device 43, identification code generator 48, and audio signal generator 49 and acoustic coupler 45. The keyboard 42 is constructed as shown in FIG. 3. The microcomputer 47 has a function of indicating data of transmission supplied from the keyboard 42 on the display device 43, and, when any of the instruction keys 42E of the keyboard 42 is pushed, has a function of combining the data of transmission, identification code and control code into one block of data and sending forth said block data to the audio signal generator 49. The identification code generator 48 produces an identification code specified for the terminal unit (for example, the identification code of the user and that of the party at the other end of the telephone line). The audio signal generator 49 converts digital data supplied from the microcomputer 47 into an audio signal. An output signal from the audio signal generator 49 is sent forth to the acoustic coupler 45.

There will now be described the operation of the portable data transmitter 41 and transmission of data by said transmitter 41 through a telephone line. First, the user pushes required keys on the keyboard 42 of the portable data transmitter 41. Data of transmission obtained from the depressed keys is indicated on the display device 43 under control by the microcomputer 47. Data of transmission is stored in a memory (not shown) received in the microcomputer 47. When the user recognizes that data of transmission indicated on the display device 43 is free from errors, then the user takes off the receiver of the telephone 39 and fits the acoustic coupler 45 to the transmitter 44 of the telephone 39 (FIG. 2). Thereafter, the user dials the telephone 39 to call a local computer room where the audio response type computer system 11 of FIG. 1 is set. Then a call sound is transmitted to the network control device 35 through the telephone line 38, subscriber telephone line network 37 and communication terminal board 36. The call sound is received by the network control device 35.

The audio response type computer 34 is put into operation in response to an output signal from the network control device 35 to process a local audio response. An output audio signal from said audio response type computer 34 is supplied to the network control device 35. The output audio signal is transmitted to the telephone 39 through the network control device 35, communication terminal board 36, subscriber telephone network 37 and telephone line 38. As a result, voices come out of the receiver of the telephone 37. The operation of the audio response type computer 34 will be later detailed.

After recognizing from the audio response that the telephone line is properly connected, the user pushes any of the instruction keys on the keyboard 42. In accordance with an instruction issued from the depressed instruction key, the microcomputer 47 combines a start code, data of transmission stored in the built-in memory, identification code supplied from the identification code generator 48, and end code into one block of data. The combined block data is conducted to the audio signal generator 49, which converts the block data into an audio signal. This audio signal is supplied to the acoustic coupler 45. The audio signal is delivered to the audio response type computer 34 through the transmitter 44 of the telephone 39 and the aforesaid data transmission route. A signal received by the audio response type computer 34 is transmitted to the host computer 10 through the adapter 33, modem 32, telephone line 31 and modem 30 in turn. The computer 10 processes a request from the portable data transmitter 41. The result of said processing is supplied to the audio response type computer 34 through the modem 30, telephone line 31, modem 32, and adapter 33 in turn. The audio response type computer 34 converts the results of processing into an audio signal. This audio signal is carried to the telephone 39 through the network control device 35, communication terminal board 36, and telephone subscriber network 37, and sent forth from the receiver of the telephone 39. While listening to the produced audio signal, the user follows an instruction given thereby. Upon completion of the aforesaid signal-processing operation, the user removes the acoustic coupler 45 from the transmitter 44 of the telephone 39 to set the receiver in its original position. The foregoing description refers to the case where a household telephone 39 was used for reservation. However, where a public telephone 40 is used for the same purpose, the same operation has only to be pursued.

There will now be described the arrangement of the audio response type computer 34 by reference to FIG. 5 which is a block circuit diagram thereof. Reference numeral 100 denotes a control processing unit (abbreviated as "CPU") for controlling the operation of the whole telephone reservation-processing system of this invention. 101 shows a main memory for storing a software program of the CPU 100. Reference numeral 102 denotes an audio memory for storing an audio pattern. With the telephone reservation-processing system of this invention, the audio memory 102 is formed of a high speed random access memory such as a semiconductor memory. The audio pattern is stored in a disk memory 103 in the digital form converted from actual audio signals and composed of words, phrases and sentences. After power is supplied, an audio pattern read out of the disk memory 103 is stored in the audio memory 102. The disk memory 103 is connected to the CPU 100 through a selector bus 104 and selector channel 105. The selector channel 105 is connected to an audio memory controller 106 and audio channels $107_1$ to $107_n$ through the selector bus 104. The audio memory controller 106 is connected to the audio memory 102 to control its operation. The audio channels $107_1$ to $107_n$ contain buffer memories $108_1$ to $108_n$. The CPU 100 sends forth a plurality of clocks of data on the address-word length relationships to the audio channels $107_1$ to $107_n$ through the selector channel 105 and selector bus 104. The respective address-word length blocks are stored in the buffer memories $108_1$ to $108_n$ received in the audio channels $107_1$ to $107_n$. Several or scores of address-word length blocks collectively define practical sentences. Therefore, the buffer memories $108_1$ to $108_n$ as a whole are chosen to have a sufficient capacity to store scores of address-word length blocks.

The audio channels $107_1$ to $107_n$ are all connected to the audio memory controller 106. Therefore, the audio channels $107_1$ to $107_n$ enable a desired audio pattern to be read out by accessing the audio memory 102 through the audio memory controller 106 in accordance with the address-word length blocks stored in the buffer memories $108_1$ to $108_n$ received in said audio channels $107_1$ to $107_n$. The output terminals of the audio channels $107_1$ to $107_n$ are respectively connected to digital-analog converters $109_1$ to $109_n$. An audio pattern (digital data) read out of the audio memory 102 is converted into an analog signal by the corresponding one of the D/A converters $109_1$ to $109_n$. The converted analog signal is transmitted to the network control device 35 (FIG. 1) through a pushbutton type signal transceiver 110. Data received by the push button type signal transceiver 110 is supplied to the CPU 100 through a multiline adapter and input-output bus 112. Connected to the input-output bus 112 are not only the communication adapter 33 but also terminal units such as a typewriter 113 and paper tape reader 114.

FIG. 6 shows relationships the address-word length blocks and audio patterns. An audio pattern having a prescribed number of words can be read out of the specified address of the audio memory 102 in accordance with selected address-word length blocks. Data on said address-word length blocks is stored in the main memory 101.

There will now be described the operation of the audio response type computer 34 arranged as described above. When said computer 34 is supplied with power, then an audio pattern stored in the disk memory 103 is read out to the CPU 100 through the selector bus 104 and selector channel 105. The audio pattern thus supplied to the CPU 100 is stored in the audio memory 102 through the selector channel 105, selector bus 104 and audio memory controller 106. Where an audio response is required after completion of the above-mentioned operations, the following procedure is taken. The CPU 100 transmits data on selected address-word length blocks on which a required audio response is based to an audio channel (for example, $107_i$) which is now left vacant through a selector channel 105 and selector bus 104. Upon receipt of a start command, the audio channel $107_i$ accesses the audio memory 102 through the audio memory controller 106 in accordance with the contents of the first one of the address-word length blocks stored in the buffer memory $108_i$ to read out an audio pattern.

The audio memory 102 is accessed through the audio channels $107_1, 107_2 \ldots 107_i \ldots 107_n$ by the time division scanning system. In other words, the audio channels $107_1, 107_2, \ldots 107_i \ldots 107_n$ access the audio memory 102 in succession for a specified period defined by a frequency of 8 KHz to produce a desired audio pattern. Accordingly, no interference arises among the audio channels $107_1, 107_2, \ldots 107_i \ldots 107_n$ when an audio is produced.

An audio pattern read out of the audio memory 102 through the audio memory controller 106 is conducted to a D/A converter $109_i$ connected to the audio channel $107_i$. An output audio signal from the D/A converter $109_i$ which has been converted into an analog signal is delivered to a network control device 35 through the push button type signal transceiver 110.

When the transmission of an output audio signal corresponding to one address-word length block is brought to an end, then an operation is carried out for the production of an audio response corresponding to the immediately following address-word length block. The same operation as described above is performed with respect to the production of an audio response corresponding to the immediately following address-word length block, details of said operation being omitted. When an audio pattern corresponding to the address-word length block stored in the buffer memory $108_i$ has been fully delivered from the converter $109_i$, then the audio channel $107_i$ supplies the CPU 100 with an interruption signal denoting the termination of the production of an audio response. The audio channel $107_i$ which has sent forth the above-mentioned interruption signal is left vacant, ready to receive the succeeding address-word length block from the CPU 100. During the period of time which starts with the transmission of the address-word length blocks to the buffer memories $108_1$ to $108_n$ of the audio channels $107_1$ to $107_n$ and ends with the issue to the CPU 100 of interruption signals denoting the termination of the production of an audio response from the audio channels $107_1$ to $107_n$, the CPU 100 can handle other data, for example, data related to services offered through the telephone line. Therefore, the audio response computer 34 can effectively process software. Since the audio response computer system 12 provided with the audio response computer 34 is installed in various districts, the user can always make a reservation through a telephone line from anywhere.

It is possible to design a general purpose telephone reservation-processing system by applying the telephone transmission terminal unit 41, audio response computer system 12 and host computer 10. Supplementary description is given by reference to FIGS. 1, 2 and 5 of the relative operations of the above-mentioned three component elements of the telephone reservation-processing system of this invention. When the user dials the telephone 39 to call the local computer room where the audio response computer system 12 is installed, then the network control device 35 catches said call signal. At this time, an output signal from the network control device 35 is supplied to the CPU 100 included in the audio response computer 34 through the pushbutton type signal transceiver 110, multiline adapter 111, and input-output bus 112. The CPU 100 causes an address-word length block required for a local audio response to be read out of the main memory 101 to the audio channel $108_i$ through the selector channel 105 and selector bus 104. The audio channel $108_i$ accesses the audio memory 102 through the audio memory controller 106 to read out an audio pattern corresponding to the above-mentioned address-word length block. The audio pattern is converted into an analog signal by the D/A converter $109_i$, an output signal from which is delivered to the network control device 35 through the pushbutton type signal transceiver 110. At this time, the operation of the pushbutton type signal transceiver 110 is changed over to the transmission of a signal to add a back word to on output audio signal being transmitted. An output signal from the network control device 35 is supplied to the telephone in the form of an audio signal through the telephone line 38 (FIG. 1).

Signals sent forth from the telephone transmission terminal unit 41 are supplied to the pushbutton type signal transceiver 110 through the telephone line 38 in the form having various frequencies. An output signal from the signal transceiver 110 is conducted to the CPU 100 through the multiline adapter 111 and input-output bus 112. The CPU 100 delivers data of transmission to the host computer 10 through the adapter 33, modem 32, telephone line 31 and modem 30. The host computer 10 processes the data received, and supplies the result of said processing to the CPU 100 included in the audio response computer 34 through the telephone line 31. In accordance with the result of processing delivered from the host computer 10, the CPU 100 reads out the corresponding address-word length blcok from the main memory. The address-word length block thus read out is transmitted to the audio channel $107_i$ through the selector channel 105 and selector bus 104. The above-mentioned operation relates to the case the audio response type computer 34 defines an address-word length block corresponding to the result of a response made by the host computer 10. However, the host computer 10 itself may define an address-word length block. In this case, the CPU 100 transmits the received address-word length block to the audio channel $107_i$, which in turn reads out an audio pattern corresponding to said address-word length block from the audio memory 102. The audio pattern is converted into an analog signal by the D/A converter $109_i$. The converted analog signal is issued through the telephone line 38 and telephone 39 in the form of an audio signal.

There will now be described the operation of a telephone reservation-processing system embodying this invention and the terminal unit-controlling computer 11 included in said system. There is now described as an embodiment of this invention the case where a telephone request for reservation is made to an automobile drive-training school.

However, the application of the invention is obviously not restricted thereto. The automobile drive-training school is an establishment authorized by the country. The trainees who have finished the regular training course and passed a state examination are awarded an automobile drive license with this embodiment, the host computer 10 is provided with various files including a trainee file, reception number-classifying file, instructor file and a car-allocation file. The terminal unit-controlling computer 11 is installed at the automobile drive-training school. Hitherto, a trainee who wants to receive training in the drive of an automobile must personally submit an application to the automobile drive-training school (hereinafter referred to as "school"). There will now be described by reference to FIG. 1 the procedure through which an applicant's document is processed. An institution clark records for example, a trainee's name, address and reception number by typewriter 22. Data supplied from the typewriter 22 is recorded in a trainee's file provided in the host computer 10 through the control computer 17, adapter 16, modem 15, telephone line 14 and modem 13. The card issuing machine 23 produces a school card on which a trainee's name, reception number, etc. are impressed. The school card is handed to a trainee. Further, a trainee card showing a training course is produced and kept in an automatic card discharge machine. However, the above-mentioned customary application system involves a great deal of inconvenience on the part of an applicant who has to visit the school often until he is informed of the data on which he can receive training. To avoid such inconvenience, this invention has been accomplished which enables an applicant for training in the drive of an automobile to make a reservation for training simply by means of a telephone. According to this invention, a telephone transmission terminal unit 41 (FIG. 2) is lent to an applicant who wants to make a telephone reservation for training in the drive of an automobile.

There will now be described by way of illustration the process through which an applicant makes a telephone reservation for training in the drive of an automobile. The operation of hardware included in the telephone reservation-processing system embodying this invention is carried out as already mentioned, description thereof being omitted.

tively divided into subsections corresponding to training in the drive of an ordinary automobile 63 and motorcycle 64. The space below the subsection of the ordinary automobile 63 is separated into divisions denoting a simulated examination 65, an examination on wireless operation 66, and a drive test 67 on the school ground and roadway. Instructor's names are shown by placing Table showing the procedure through which an applicant makes a telephone reservation for training in the drive of an automobile

| Applicant's operation of the telephone 39 and telephone transmission | Processing by an audio response type computer 34 | Processing by a host computer 10 |
|---|---|---|
| (1) The applicant presets data such as the data and time desired for training, instructor's code, school code and reception code, in the terminal unit 41. | | |
| (2) The applicant attaches the speaker section of the terminal unit 41 to the telephone 39. | | |
| (3) The applicant dials a local computer room through the telephone 39. The applicant recognizes the response. | → (3)' The computer 34 makes ← a local audio response | |
| (4) The applicant pushes an instruction key on the keyboard of the terminal unit 41 | → (4)' The computer 34 transmits received data to the host computer 10. | → (4)" The computer 10 processes data to make a response corresponding to the received instruction, and sends forth a signal denoting the result to said processing. |
| The applicant recognizes the result of processing made by the host computer | ← The computer 34 converts the result of processing made by the host computer 10 into an audio signal, which is transmitted to the telephone 39 | ← Where an instruction for reservation is received, the host computer 10 determines whether the identification code of the terminal unit 41 is recorded, whether a training fee has been paid, or whether a reservation can be accepted. In case a reservation can be accepted, the host computer 10 makes a response to that effect. |
| (5) The applicant pushes an instruction key on the keyboard of the terminal unit 41. | → (5)' The computer 34 transmits received data to the host computer 10. | → (5)" The host computer 10 processes data to make a response corresponding to the received instruction, and sends forth a signal denoting the result of said processing |
| The applicant recognizes a response made by the host computer 10 (completion of the filing of reservation) | ← The computer converts the result by processing made by the host computer 10 into an audio signal, which is transmitted to the telephone 39 | ← Where a reservation is accepted at the issue of a second reservation instruction, the host computer 10 makes a response to that effect. |

It is possible to omit the step (5) from the procedure of the above table. Said omission can be easily effected by designing a program including the processing of data required to complete the acceptance of a reservation.

The host computer 10 not only carries out the processing of data for the telephone reservation, but also controls the attendance of instructors working with the school. The attendance of instructors at the school, and the acceptance of a telephone reservation for technical training or test can be indicated on a reservation display board 20 connected to the control computer 17.

FIG. 7 shows the external appearance of the reservation display board 20. This display board 20 has two display sections 60, 61. Reservations (not only by telephone but also by other means) for the current day and those for the data one or several days ahead of the current day are displayed by lamp for each prescribed length of time. The display sections 60, 61 are respecthe name plates in the columns below the division representing the drive test 67 on the school ground and roadway and the division denoting the drive test 64 of a motorcycle. A 2-color display lamp is provided above each instructor's name plate to indicate his attendance or absence on the current day. Ten rows of 2-color display lamps corresponding to 10 hours of training are set below the columns representing the simulated examination 65, examination on wireless operation 66, and motorcycle 64 to indicate by a display of different colors whether a reservation is or not made for the respective hours. The 3-color display lamps are provided for each instructor in the space below the column denoting a drive test 67 on the school ground and roadway to indicate the absence of a reservation for the school ground drive test, and the absence and acceptance of a reservation for the roadway drive test all for the respective hours. The characters "current day", and the corresponding calendar data (month and day) and weekday, and the characters "one day ahead", and the corresponding calendar data (month and day) and weekday are displayed in the form of a dotted matrix on the left side of the respective dispaly sections 60, 61. Display of a reservation for the current day, or for a data one day or several days ahead thereof is made for each of the prescribed number of hours (for example, 10 hours for day). The reservation display board 20 further has a particular display section 62. Where an applicant notifies the school of the cancellation of his accepted reservation a prescribed length of time before the commencement of his training, then two display lamps provided in said display section 62 indicate that no reservation is made for training in the drive on the school ground and roadway.

There will now be described by reference to the flow charts of FIGS. 8A and 8B transmission of data between the above-mentioned reservation display board 20, control computer 17 and host computer 10. Transmission of data between the control computer 17 and host computer 10 is carried out through a telephone 14 (FIG. 1). In the following description however, no reference is made to the telephone line 14.

Where the reservation display board 20 is supplied with power, then the internal display memory (not shown) has its contents cleared. At this time, the reservation display board 20 issues a signal requesting the supply of data being displayed to the control computer 17. Upon receipt of said signal, the control computer 17 transmits to the host computer 10 said signal, to which there are now added the district code and school code. When receiving from the control computer 18 the above-mentioned signal requesting the supply of data being displayed, then the host computer 10 transmits a first data of display showing a function code, and a calendar data and weekday an n number of days ahead of the current data. When the reservation display board 20 receives the first data of display, a pattern of said first data of display is stored in the corresponding section of the internal display memory. Thereafter, the host computer 10 transmits a second data of display showing a function code, a calender data and weekday an n+1 number of days ahead of the current data, the sequential order of the specified row of 2-color display lamps (corresponding to any of the prescribed hour of training), the attendance or absence of instructors and the current condition of reservations all to the reservation display board 20 through the control computer 17. The display of the specified row of the 2-color display lamps is continued, until the display of a data one day ahead of the current day and other associated data is brought to an end. At this time, flags instructing the display of data for the current day as well as for a data one day ahead thereof are reset. Thereafter, flags instructing the display of data for the succeeding datas 2 and 3 days ahead of the current day are set.

A display change timer is reset a prescribed length of time after it is started. A display-instructing signal is again generated. Where, at this time, it is determined that flags are set for the display of data for dates 2 and 3 days ahead of the current day, then operation proceeds to the step of carrying out said display. The same operation as in the display of data for the current day and a data one day ahead thereof is carried out in the display of data for dates an l number of days and an l+1 number of days ahead of the current day and dates an n−1 number of days and an n number of days ahead thereof. Where, at the last step of display, the contents of the flags set for the display of the succeeding data represent dates an l number and an l+1 number of days ahead of the current day, then an instruction is issued to display data on dates an n−1 number and an n number of days ahead of the current day. Where the contents of said flags denote dates an n−1 number and an n number of days ahead of the current day, then the display cycle is returned to the starting point, and an insturction is given to display data on the current day and a data one day ahead thereof. Where the user changes the contents of his previous telephone reservation, then the host computer 10 supplies said changed data to the control computer 17, whose internal display memory has its contents changed accordingly. The training reservation display board embodying this invention enables the vacant hours of instructors to be recognized at a glance by the control of the host computer 10.

There will now be described by reference to FIGS. 9A and 9B the arrangement and operation of an automatic card discharge machine 21. When a trainee inserts his identification card (school card) 70 into the card discharge machine 21, then the machine 21 automatically issues a report card 78 on the results of techincal training and tests carried out by the school, inquires a trainee card 75, indicates the location where the trainee card 75 is stared by lamp display, and pushes forward said trainee card 75 to be easily gripped by the trainee. FIG. 9A is a an oblique front view of the automatic card discharge machine 21. When a school card 70 is inserted into a slit 71, the internal school card reader reads the contents of the school card 70. The data thus read out is transmitted to the host computer 10 through the control computer 17 (FIG. 1). Necessary data is impressed on a report card 78 regarding the results of the technical training and tests of the school by a printer installed in the card discharge machine 21. The impressed report card 78 is drawn off from a discharge port 72. The report card 78 indicates the name and number of a trainee, periods of received training classified by the tapes (for example, training in the automobile drive on the school ground and roadway and simulated examination), the number of a school card used by the traince in training, and instructor's codes. The report card 78 is prepared from data supplied from the host computer 10, which further supplies data required to search for a trainee card 75. Where the trainee card 75 is taken out, then the corresponding display lamp 74 of the card holder 73 is lighted, and the required trainee card 75 is pushed forward. FIG. 9B indicates the back side of the automatic card discharge machine 21. The card of a trainee who has finished the training of the current day is inserted into a collection box 76. When a card loading switch 77 is pushed, the collection box 76 slides to store the cards of the trainees who have finished the training of the current day in a vacant area. A number allotted to the vacant area is stored in both host computer 10 and automatic card discharge machine 21.

There will now be described by reference to FIGS. 10A and 10B the transmission of data between the automatic card discharge machine 21, control computer 17 and host computer 10.

When a trainee inserts a school card (or identification card) into the card discharge machine 21, then the trainee's number is read by the card reader. An insturction for the discharge of the trainee card is issued in accordance with the trainees's number. When supplied with said instruction, the control computer 17 adds a district code and school code to said instruction, and sends forth to the host computer 10 an instruction requesting the discharge of a trainee card to which the district code and school code have been added. When receiving said trainee card discharge-requesting instruction, then the host computer 10 checks the registration of a trainee in question in the school file, picks out his reservation classified by the training time, and further examines whether said reservation has been actually accepted and whether part of his training fee is overdue and still remains unpaid. Thereafter, the host computer 10 transmits data on the name and number of a trainee, reservation for technical training (classified by the type of training, a number of a school car allocated to the trainee and instructor), reservation for an examination (classified by the examination time and a group of examinees), and arrearages of a training fee to the automatic card discharge machine 21 through the control computer 17. The host computer 10 further transmits signals denoting a rack number and address required to search for a trainee card to the automatic card discharge machine 21 through the control computer 17. Upon receipt of the above-listed data, the card discharge machine 21 first draws out a trainee's school card or identification card. Thereafter, the machine 21 prints various report cards from transmitted data such as the trainee's number, arrearage of his training fee, etc. and discharges printed reports. The card discharge machine 21 searches for a trainee card in accordance with signals denoting the rack number and address, and pushes out the trainee card. When a trainee takes out his trainee card, a number of vacant areas of the corresponding rack is added to the contents of a rack area counter, and the address allotted to the discharged trainee card is cleared, thereby making preparations for the insertion of a new trainee card. Where a desired trainee card is not found in the searched rack, then an error report card is printed and discharged.

As apparent from the foregoing description, the telephone reservation-processing system of this invention has the following prominent advantages.

(1) Since a plurality of audio response type computers are installed in various districts, telephone reservations can be made over a broad district without a heavy load on a host computer.

(2) An audio pattern is stored in a semiconductor audio memory and can be quickly read out.

(3) Since a plurality of audio channels access on audio memory by a time division scanning system, the audio channels are saved from mutual interference when an audio signal is produced. Accordingly, the software of the audio response type computer can handle each audio channel as a single independent device.

(4) Since each audio channel accesses the audio memory by an address-word length block, a long sentence can be easily read out of the audio memory.

(5) The telephone subscriber can easily make a telephone reservation through a telephone and a telephone transmission terminal unit.

(6) The state of telephone reservation can be easily recognized on, for example, a reservation display board. The telephone reservation-processing system of this invention can be applied in various business fields such as special training schools, hotels, electric trains and airways.

What is claimed is:

1. A telephone reservation-processing system which comprises a host computer;

a plurality of audio response type computers connected to the host computer through a telephone line;

at least one terminal unit-controlling computer connected to the host computer through a telephone line; and a large number of telephones connected to the plural audio response type computers through a telephone line, and wherein the host computer includes means for processing data relative to requests for reservations, inquiries and cancellations transmitted from the telephone through the audio response type computer, and means for processing data relative to requests for transmission of data delivered from the terminal unit-controlling computer; each of the plural audio response type computers includes a semiconductor audio memory for storing an audio pattern, an audio channel for accessing the audio memory, means for actuating the audio channel in accordance with the result of a response made by the host computer, and means for converting the result of a response made by the host computer into an audio signal and transmitting said audio signal to the telephone when the audio channel accesses the audio memory; and the terminal unit-controlling computer includes means for supplying the host computer with a signal requesting reservation, inquiry or cancellation delivered from the terminal unit and transmitting data sent forth from the host computer to the terminal unit.

2. The telephone reservation-processing system according to claim 1, wherein the telephone is fitted with a telephone transmission terminal unit; the audio response type computer is called by the telephone; after the contents of an output audio signal from the audio response type computer are recognized, data of transmission present in the telephone transmission terminal unit is sent forth to the audio response type computer.

3. The telephone reservation-processing system according to claim 2, wherein the telephone transmission, terminal unit comprises:

a keyboard provided with data keys and instruction keys;

a microcomputer for controlling the display on the display device of data of transmission delivered from the keyboard;

a circuit for producing an identification code specified for the telephone transmission terminal unit;

a circuit for converting, upon depression of an instruction key, data of transmission supplied from the microcomputer and identification code into audio signals; and an acoustic coupler for conducting said audio signals to the telephone.

4. The telephone reservation-processing system according to claim 1, wherein the terminal unit controlling computer is connected to a reservation display board to indicate data for reservation display supplied from the host computer on the reservation display board.

5. The telephone reservation-processing system according to claim 1, wherein a plurality of audio channels are provided to access the audio memory of the audio response type computer; the central processing unit for controlling the audio response type computer selects one of the audio channels and sends forth an address-word length block for specifying one of the audio patterns stored in the audio memory in accordance with the result of a response made by the host computer; and the selected audio channel accesses the audio memory by the corresponding address-word length block.

6. The telephone reservation-processing system according to claim 1, which comprises:
 a host computer;
 an audio response type computer connected to the host computer through a telephone line;
 a telephone connected to the audio response type computer through the telephone line;
 means for transmitting a request of reservation for lectures at a training institution from the telephone to the host computer by means of the telephone transmission terminal device through the audio response type computer;
 means for transmitting to the telephone in the form of audio signals denoting the result of processing said request by the host computer which have been converted into audio signals;
 a terminal unit-controlling computer installed at the training institution and connected to the host computer through a telephone line; and means for transmitting the state of reservation from the host computer to the reservation display board connected to the terminal unit-controlling computer for display of said state of reservation.

* * * * *